ns Patent Office
3,384,112
Patented May 21, 1968

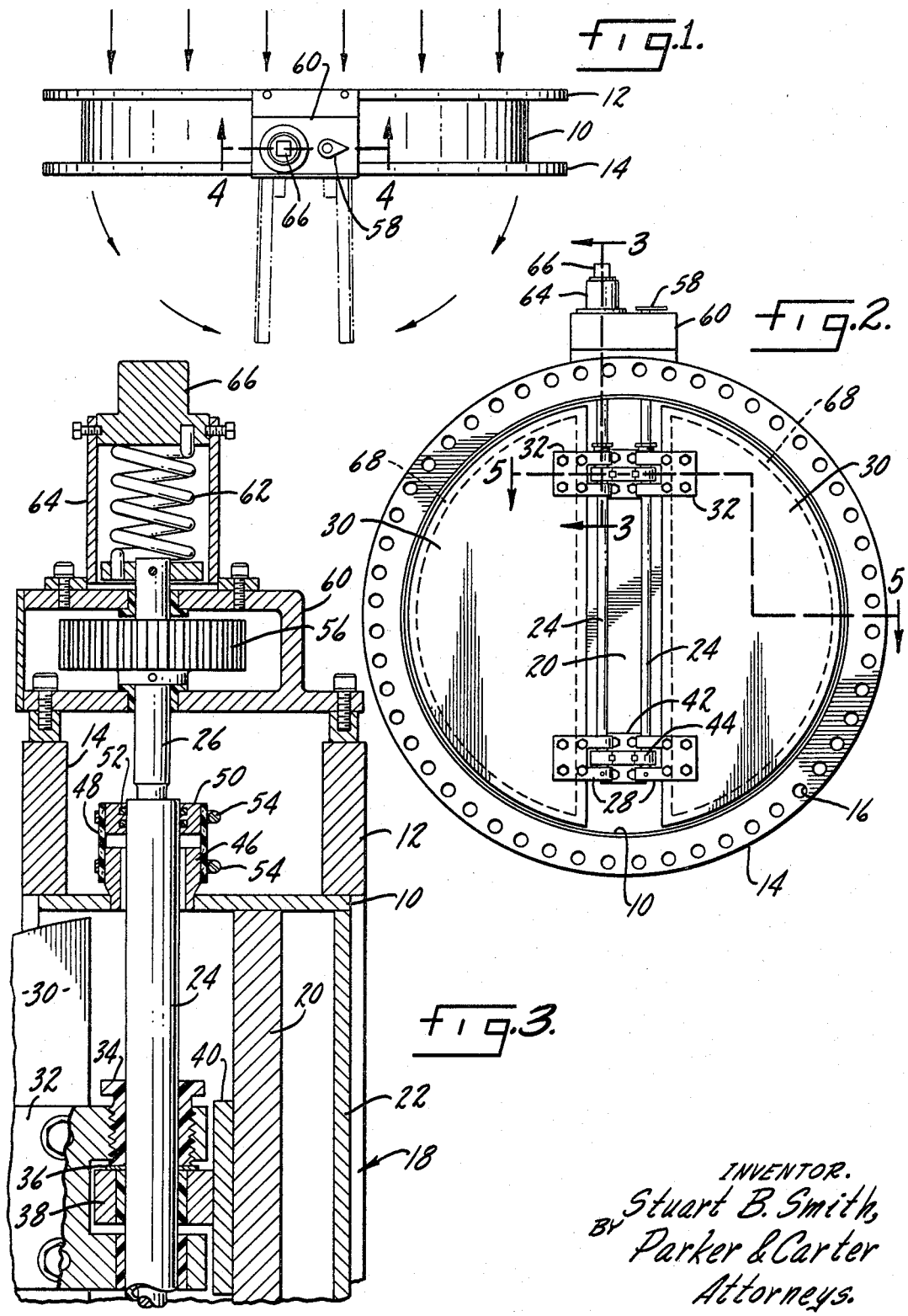

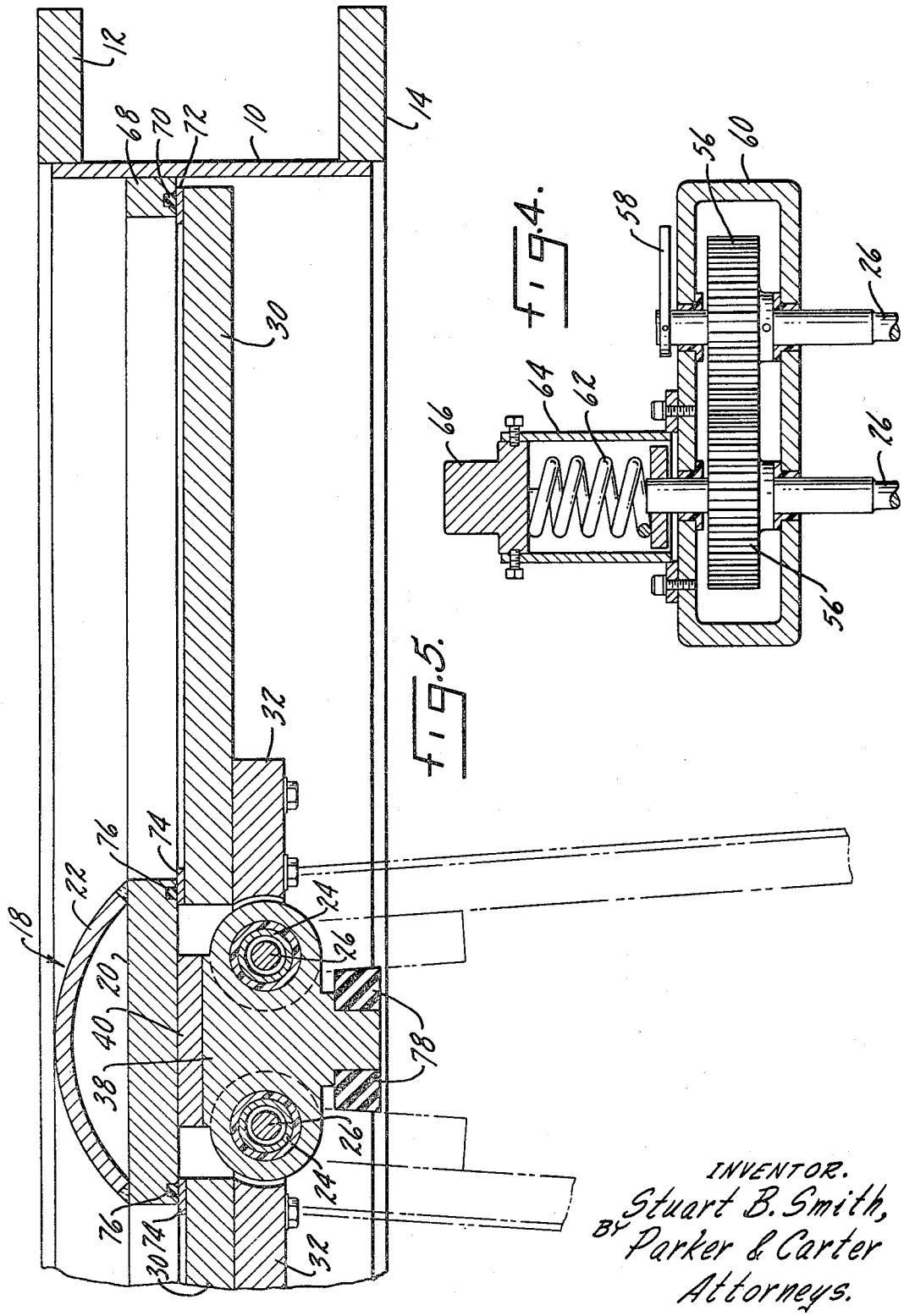

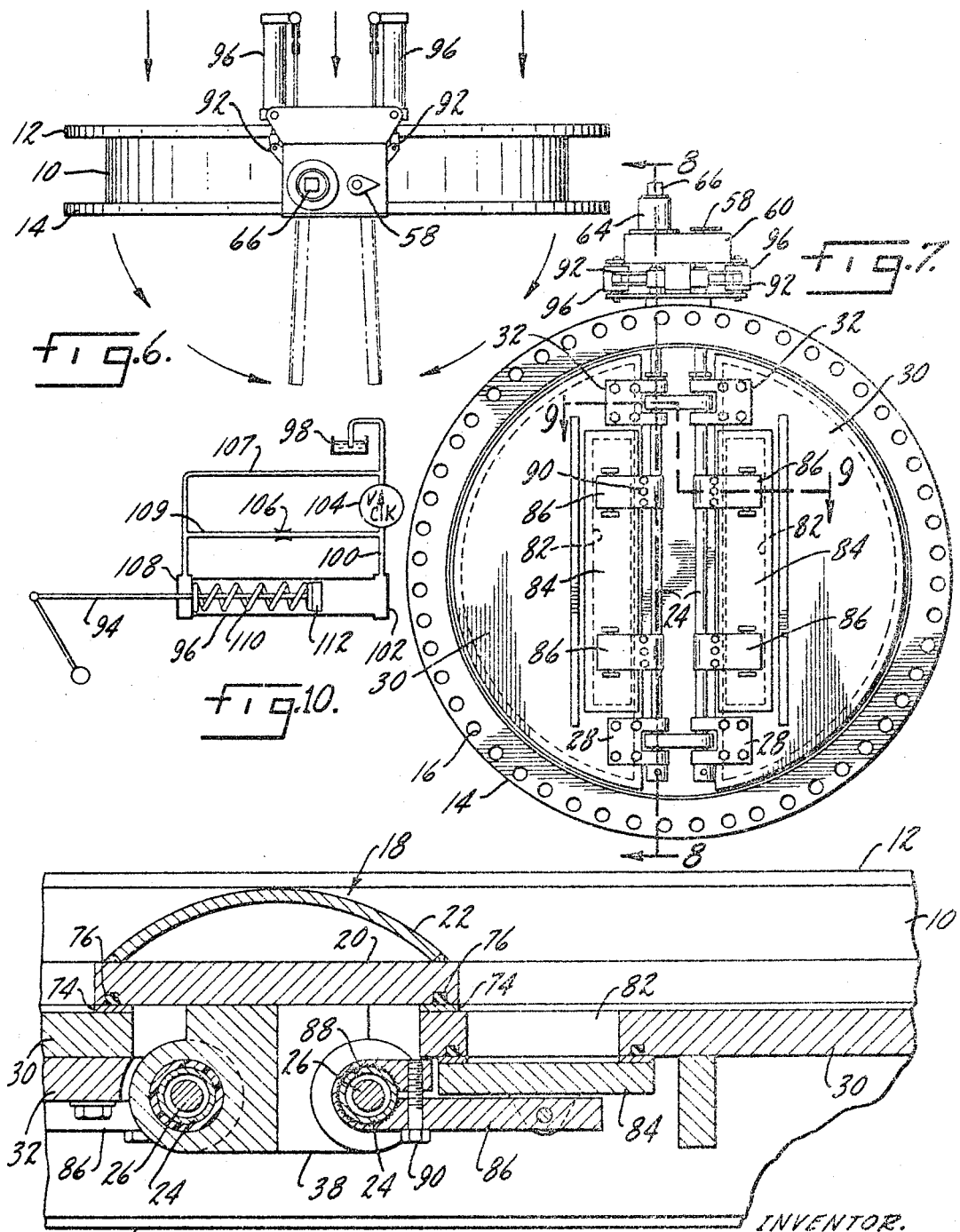

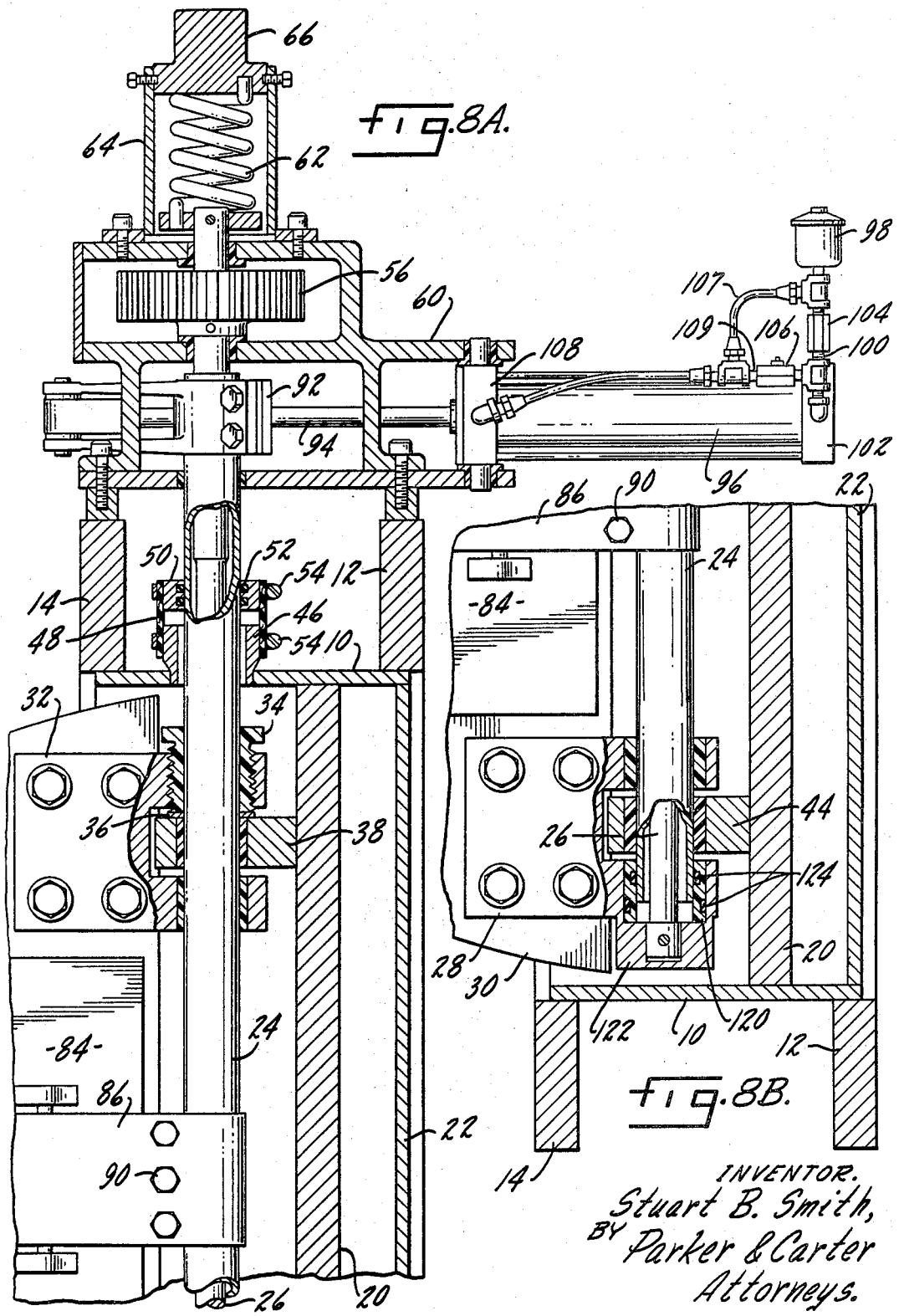

3,384,112
ISLAND CHECK VALVE
Stuart B. Smith, Osprey, Fla., assignor to
John W. Woolley, Oak Park, Ill.
Filed Dec. 15, 1965, Ser. No. 513,951
12 Claims. (Cl. 137—512.1)

This invention relates to an island check valve and particularly to a check valve construction utilizing a pair of movable vanes which are interconnected through torsion members and gearing to provide synchronized operation.

One purpose of the invention is a check valve of the type described in which the vanes are connected by torsion bars to synchronizing gearing to eliminate the possibility of damage to the gearing due to obstructions in the line which might prevent one of the vanes from being positioned identically with the other vane.

Another purpose is a check valve of the type described utilizing an external biasing spring arrangement which allows the closure characteristics of the valve to be externally adjusted for optimum closure rates in any given system.

Another purpose is a check valve of the type described utilizing a shaft seal assembly that is both low in friction and tolerant of variations in axial, lateral and angular position of the shaft seal assembly.

A primary purpose of the invention is a check valve of the type described which can be optimized for performance in any given system by synchronizing valve characteristics with system characteristics.

Another purpose is a synchronized check valve of the type described having secondary vanes for closing smaller openings within the check valve, which smaller openings provide surge relief in a preventative manner in that they are open before surge pressures are reflected to the valve rather than after surges have occurred as is the case with conventional surge relief valving systems.

Another purpose is a check valve of the type described which effectively isolates a pump or water source from flowback from within the system and which provides non-shock pump startup and shutdown, even under power failure conditions.

Another purpose is a synchronized check valve of the type described which operates without any external control or sensing devices, but whose operational characteristics are such that it inherently responds to system changes to eliminate shock conditions.

Another purpose is a synchronized check valve of the type described which operates without external power sources.

Another purpose is a synchronized check valve of the type described having a vane position indicator which can be either remotely or locally monitored.

Another purpose is a reliably operable simply constructed synchronized check valve of the type described.

Other purposes will appear in the ensuing specification, drawings and claims.

The invention is illustrated diagrammatically in the following drawings wherein:

FIGURE 1 is a top plan view of one form of the invention,

FIGURE 2 is a front elevation of the valve in FIGURE 1,

FIGURE 3 is a section along plane 3—3 of FIGURE 2,

FIGURE 4 is a section along plane 4—4 of FIGURE 1,

FIGURE 5 is a section along plane 5—5 of FIGURE 2,

FIGURE 6 is a top plan view of a second form of the invention,

FIGURE 7 is a front elevation of the valve in FIGURE 6,

FIGURES 8A and 8B are the upper and lower halves of a section along plane 8—8 of FIGURE 7, FIGURE 9 is a section along plane 9—9 of FIGURE 7, and FIGURE 10 is a schematic diagram of the hydraulic system.

In that form of the invention illustrated in FIGURES 1–5, the island type check valve shown and described herein may include an annular circumferential wall 10 having flanges 12 and 14 extending outwardly therefrom. The flanges 12 and 14 may have bolt holes or the like 16 for use in attaching the flanges to the mating flanges of conduit sections. The present invention is designed to be positioned within a conduit, at any place within a fluid system, but normally adjacent a pump. In effect, the section 10 forms a part of the conduit.

An island indicated generally at 18 may extend between diametrically opposed points on the conduit section 10. The island 18 may include a flat plate or the like 20 which is attached by welds or the like to a somewhat curved front face plate 22 which extends toward the direction of flow. A pair of spaced sleeves or tubes 24 may be positioned on opposite sides of the island, with the upper end of each of the sleeves 24 extending through the conduit section 10. Within each of the sleeves 24 are torsion bars or torsion members 26, with the lower end of each torsion member being pinned to one arm of a flat hinge strap 28. Each of the lower hinges are in turn directly fastened to a large semicircular vane 30, with the vanes being effective to close the conduit section 10 when they are in the illustrated closed position. Note that the torsion bars are only pinned or connected to the vanes at their lower ends. A similar hinge strap 32 is attached to the upper half of each vane, with each strap 32 being fixed to a thrust bearing 34 which encircles one of the tubes 24. Just below the thrust bearing 34 is a thrust washer 36 which is positioned between the thrust bearing 34 and a lower hinge member 38, the hinge member 38 being attached to a plate 40 which in turn is fixed to the island plate 20. A similar plate 42 is positioned at the lower hinge, and there is a hinge member 44 which is attached to the plate 42 and which encircles the tube or sleeve 24. Note that the bottom or lower end of the tube or sleeve 24 is welded or otherwise suitably fixed to the hinge strap 28 in a manner as to effectively seal against influx of fluid into the inside of tubes 24. In the construction illustrated, each torsion bar will rotate with its connected vane.

At the upper end each sleeve 24 extends outwardly through an opening in the conduit section 10 and is partially enclosed by a socket 46. A hose section or the like 48 encloses the outer surface of each socket 46 and extends upwardly and surrounds a sealing member 50. The sealing member 50 may include small O-rings or the like 52 which actually enclose the upper end of the tube 24. Clamps or the like 54 encircle the hose section 48 and firmly hold it to both the socket 46 and to the sealing section 50.

The upper end of each torsion bar 26 extends outwardly beyond each tube 24 and has a gear 56 attached to its upper end. Note that the right and left-hand gears are in mesh together so that any torque applied to one torsion bar will be distributed between the two bars. The right-hand torsion bar may have an indicating member 58 attached to its far upper end that extends through gear 56. The indicator 58 is outside of a small housing 60 which is fastened onto the flanges 12 and 14 and which encloses both gears. The left-hand torsion bar extends through its gear and is fixed to a spring 62. The spring 62 may be a coil spring and is positioned within a small housing 64, the upper end of which is closed by a member 66. The lower end of the spring may be pinned or otherwise suitably secured to the left-hand torsion bar.

The inside surface of the conduit section 10 may have an annular member 68 which may be integral with island plate 20 and which may have a seal member 70 positioned on one face for contact with the vane when the vane is in the closed position. Each of the vanes 30 may have stainless steel sealing areas 72 and 74, with area 72 extending circumferentially about the outside of each vane, and area 74 extending along the inner edge adjacent the island. Island plate 20 may have sealing areas 76, on opposite sides of the plate, for contact with the stainless steel sealing areas 74. The form of the invention shown in FIGURES 1–5 may be completed by dampers or rubber bumpers 78 which are attached to hinge members 38 and 44 and positioned to contact the hinge straps when the vanes are in the open position.

In operation, when the check valve shown herein is connected in a line with a pump, the force of the fluid pressure, whether the fluid be water, or any other fluid, will force both of the vanes from the closed position to the open position. Normally the vanes are held in the closed position by the action of spring 62. This spring is of a size such that the fluid pressure can easily move both vanes to the full open position. The force of the spring is transmitted equally to both of the vanes through the interconnected gears 56. Normally the check valve shown herein is only to be utilized in a one-way flow system. When the flow from the source decreases in pressure, the vanes will start to close and the action of spring 62 will permit the vanes to close in accordance with the reduction of fluid flow. When the flow has reached zero, the vanes will have reached a full closed position. The vanes will close slowly and they will close in direct relationship with the decrease in flow through the line.

If there should be an obstruction in the line which settles at the check valve, for example a log is a common obstruction in large water systems, and if such a log prevents the complete closing of one of the vanes, the other vane can still close. The torsion bars can take the torque which is applied by the vane which is not closed, and can distribute this torque between the two torsion bars so that one vane can be fully open and the other fully closed. Naturally, some of this torque will be taken up by spring 62. Preferably the torsion bars are formed of a material such that they can be twisted through an angle of 45 degrees.

Normally the vanes will be completely synchronized in their operation through the gearing arrangement and they will be spring driven. However, in the event of an obstruction, there may be a difference of 90 degrees in the relative position of the two vanes with no damage to the check valve. Naturally in such a position the flow pattern would not be normal as one vane could be completely open and the other completely closed and there might be backflow. However, the check valve would not be injured or damaged and the valve position indicator would give an indication that there was something wrong with the system.

Turning now to that form of the invention illustrated in FIGURES 6–10, like parts have been identified with the same numerals as the form of FIGURES 1–5. A passage or opening 82 is formed in each vane 30. Secondary vanes 84 are fixed to the sleeves 24 for rotation with the sleeves. Each of the vanes 84 may have a pair of spaced brackets 86 which are fixed to the sleeves 24. Preferably a portion of the inner surface of each bracket, at the bearing locations, is serrated as at 88 to form a driving connection between the sleeve and the brackets 86. Bolts or the like 90 may be used to securely fasten the brackets 86 about the serrated section of the tubes 24.

The lower end of each sleeve 24, below the bracket 86, may include a sealing assembly 120. A socket 122 may be attached to hinge strap 28, with the socket 122 mounting the shaft sealing assembly 120. The sealing assembly 120 may include seal rings 124, with the inner ring bearing against sleeve 24 and the outer ring sealing against socket 122.

The upper end of each of the tubes 24, unlike the form of the invention illustrated in FIGURES 1–5, continue upwardly beyond the shaft seal assembly and are each fixed to levers 92. Each of the levers 92 are in turn fastened to rods 94 which extend outwardly from piston and cylinder assemblies 96. Each piston and cylinder assembly may be pivotally mounted onto housing 60.

As shown in FIGURE 10, a fluid reservoir 98 may be connected by a line 100 to the cap end 102 of the piston and cylinder 96. A check valve 104 is placed in line 100 to prevent flow from the cap end 102 to the reservoir, but to permit it in the reverse direction. A line 107 may connect rod end 108 with the reservoir. A needle valve 106, in line 109, may connect the lower side of check valve 104 with rod end 108.

Under normal operating conditions, both the secondary vanes 84 and the primary vanes 30 will simultaneously open as fluid pressure within the conduit increases sufficiently to move the vanes from their initially closed position. Because both the primary and secondary vanes open together, the secondary vanes 84 will be closed with respect to the openings 82 in the vanes 30. However, both vanes will be open with respect to the conduit itself. As the secondary vanes are opened, piston 112, illustrated in FIGURE 10, will be pulled toward the left, against the action of spring 110. As the piston moves in this direction, fluid will be forced through line 107 back to reservoir 98. Simultaneously, fluid will flow through line 100, past check valve 104, and into the right-hand side of the cylinder.

When the fluid flow in the conduit starts to decay or decrease, the primary vanes will close first as they are held open solely by water flow. However, in the case of the secondary vanes, they will not close as rapidly as the primary vanes and in fact they will remain open relative to the primary vanes. In order for the secondary vanes to close, spring 110 must force piston 112 toward the right, as shown in FIGURE 10. Fluid on the right-hand side of piston 112 can only pass through needle valve 106 in its path to the opposite side of the cylinder. The amount of fluid which the needle valve 106 will permit to flow through it will determine the rate of movement of piston 112 and hence the rate of closing of the secondary vanes. It is desired that the secondary vanes close at a much slower rate than the primary vanes so as to prevent water hammer and also to compensate for any last minute pressure surges within the line itself. Such pressure surges can be taken care of by the openings 82 in the primary vanes and it will not be necessary for the primary vanes to open again.

The use, operation and function of the invention are as follows:

Shown and described herein is an island type check valve designed for use in large water systems, although obviously the invention should not be limited to this particular application. Normally the invention may be placed close to a pump and the flow from the pump alone is sufficient to open the vanes of the check valve and permit free flow by the valve. The vanes will be held in the open position as long as flow is from the pump side of the line. When there is a reduction in flow, the spring which normally biases both of the primary vanes toward a closed position will slowly start to close these vanes. The primary vanes will close with the reduction in flow with the result that when the flow in the line is finally reduced to zero, the primary vanes will come to a completely closed position.

Of importance in the invention is the fact that a single spring provides the torque for closing both of the large primary vanes. The primary vanes are each attached to torsion bars and the torque for closing the vanes is supplied from the spring, through meshed gears, and then to the torsion bars. The torsion bars are particularly advantageous in that if there is an obstruction in the line which prevents one of the vanes from closing, the other vane may close completely. The spring will continue to apply closing torque, and this torque will be taken up by generally equal twisting of the torsion bars. The vanes are synchronized and they will move together. However, if one cannot close, the other will close and there will be a twist, substantially the same in each torsion bar, to take up the closing torque. The torsion bars may be formed of different materials and of different lengths and thicknesses, however, it is preferred that the torsion bars be effective to take up to about 45 degrees angular twist so that one vane may be completely open and the other vane completely closed.

In that form of the invention shown in FIGURES 6–10 the primary vanes operate in the same manner. In addition, each primary vane mounts a secondary vane. The secondary vanes will open with the primary vanes, again by fluid flow from the pump side of the line. However, the closure of the secondary vanes is controlled by the hydraulic piston and cylinder arrangement such that the secondary vanes will not close at the same rate as the primary vanes, but will remain open to take care of any sudden surges after the main vanes have been closed. Of particular advantage when using secondary vanes is that all water hammer is eliminated. The system shown in FIGURES 6–10 is advantageous over a conventional system in that the vanes are opened before any pressure rise in the system is experienced rather than after abnormal pressure conditions are reached as is normally the case with conventional surge relief valving systems which depend upon abnormal pressure rises to open and begin their receiving function.

The primary and secondary vanes may open together or the secondary vanes may open first, depending upon the relative spring constants of springs 110 and 62.

When using the check valves in water systems, which may be as large as four to five feet in diameter, it is advantageous to use corrosion-resistant material. As it is difficult to fabricate torsion rods out of corrosion-resistant material, the torsion rods are enclosed by a tube or sleeve which is formed of a suitable corrosion-resistant material, for example stainless steel. Such tubes of sleeves are readily available in these materials, whereas torsion bars are not.

It is important to note that no external power sources or control devices are required to open or close the valves. There is an external indicator which shows whether the vanes are open or closed. If the valves were thought to be in a closed position due to the inactivity of the pump, but yet the indicator showed the valve open or partially open, it would be a clear indication that there was an obstruction at the check valve.

The indicator is shown as being attached directly to one of the torsion bars and outside of the valve pump. It should be understood however that a remote indication may also be provided by the same indicator.

Whereas the preferred form of the invention has been shown and described herein, it should be realized that there are many modifications, substitutions and alterations thereto within the scope of the following claims.

I claim:

1. In a check valve for use in a conduit or the like, an outer shell, a generally central island within the shell, a pair of vanes, pivotally mounted on opposite sides of said island, for blocking flow through the shell, a pair of spaced torsion members mounted in said island, with each of said vanes being attached to one of said torsion members, means interconnecting said torsion members to distribute the torque applied to either member to both of said members, and yielding means connected to said torsion members for urging said vanes to a normally closed position to block flow through the shell.

2. The structure of claim 1 further characterized in that the means interconnecting said torsion members includes a gear attached to each torsion member, said gears being in operable contact with each other.

3. The structure of claim 2 further characterized in that said yielding means includes a spring fixed to one of said torsion members.

4. The structure of claim 1 further characterized in that each of said vanes is fixed to a torsion member, adjacent one end of said torsion member, with said torsion members being interconnected together at their opposite ends.

5. The structure of claim 1 further characterized by and including flow openings in said vanes, and movable secondary vanes for closing said vane flow openings.

6. The structure of claim 5 further characterized in that said secondary vanes are opened by fluid flow, and means for controlling the closing of said secondary vanes independent of fluid flow.

7. The structure of claim 6 further characterized in that the means for controlling the closing of said secondary vanes includes at least one hydraulic piston and cylinder.

8. The structure of claim 5 further characterized by and including a tube enclosing each of said torsion members, with said secondary vanes being fixed to said tubes, said tubes being rotatable relative to said torsion members.

9. The structure of claim 1 further characterized by and including a tube enclosing each of said torsion members, the inner surface of each tube being spaced from its enclosed torsion member and being formed of a corrosion-resistant material, and sealing means about the opposite ends of said tubes.

10. The structure of claim 9 further characterized in that the sealing means about one end of said tubes includes a socket enclosing a tube end, a flexible member about said socket, and clamping means holding said flexible member to said tube.

11. The structure of claim 1 further characterized by and including an indicator attached to one of said torsion members for indicating the position of said vanes within the shell, said indicator being outside of the shell.

12. The structure of claim 1 further characterized by and including secondary flow openings in said valve, and pivotal secondary vanes for closing said secondary flow openings, and means, independent of fluid flow through said shell, for controlling movement of said secondary vanes.

References Cited

UNITED STATES PATENTS

| | | | |
|---|---|---|---|
| 1,978,127 | 10/1934 | Downs | 137—513 X |
| 2,198,447 | 4/1940 | Witte | 251—337 X |
| 3,009,473 | 11/1961 | Hennen | 137—601 X |
| 3,137,312 | 6/1964 | Hanes | 137—505.42 X |
| 3,179,164 | 4/1965 | Heller et al. | 137—512.2 X |
| 3,241,568 | 3/1966 | Mayo | 137—601 |
| 3,250,203 | 5/1966 | Spradling et al. | 137—513 X |

ALAN COHAN, *Primary Examiner.*

D. J. ZOBKIW, *Assistant Examiner.*